US012627785B2

(12) United States Patent
Chupeau et al.

(10) Patent No.: US 12,627,785 B2
(45) Date of Patent: *May 12, 2026

(54) METHOD AND APPARATUS FOR DELIVERING A VOLUMETRIC VIDEO CONTENT

(71) Applicant: INTERDIGITAL VC HOLDINGS, INC., Wilmington, DE (US)

(72) Inventors: Bertrand Chupeau, Rennes (FR); Gérard Briand, Ploufragan (FR); Renaud Dore, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/924,932

(22) Filed: Oct. 23, 2024

(65) Prior Publication Data

US 2025/0047822 A1 Feb. 6, 2025

Related U.S. Application Data

(63) Continuation of application No. 17/629,242, filed as application No. PCT/US2020/041878 on Jul. 14, 2020, now Pat. No. 12,160,555.

(30) Foreign Application Priority Data

Jul. 22, 2019 (EP) ..................................... 19305968
Dec. 20, 2019 (EP) ..................................... 19306721

(51) Int. Cl.
  *H04N 13/178* (2018.01)
  *H04N 13/161* (2018.01)
  *H04N 13/194* (2018.01)
(52) U.S. Cl.
  CPC ......... *H04N 13/178* (2018.05); *H04N 13/161* (2018.05); *H04N 13/194* (2018.05)

(58) Field of Classification Search
  CPC .. H04N 13/178; H04N 13/161; H04N 13/194; H04N 13/117; H04N 19/46; H04N 19/597
  See application file for complete search history.

(56) References Cited

U.S. PATENT DOCUMENTS

| | | | |
|---|---|---|---|
| 6,556,206 B1 | 4/2003 | Benson et al. | |
| 10,841,557 B2 | 11/2020 | Martineau et al. | |
| (Continued) | | | |

FOREIGN PATENT DOCUMENTS

| | | |
|---|---|---|
| CN | 105165008 A | 12/2015 |
| CN | 108370455 A | 8/2018 |
| (Continued) | | |

OTHER PUBLICATIONS

Boyce et al., "Working Draft 1 of Metadata for Immersive Media (Video)", MPEG Meeting: Mar. 25-29, 2019; Geneva (Motion Picture Expert Group or ISO/IEC JTC1/SC29/VVG11), Document: N18464, Apr. 19, 2019, 33 pages.

(Continued)

*Primary Examiner* — Fernando Alcon
(74) *Attorney, Agent, or Firm* — Klintworth & Rozenblat LLP

(57) ABSTRACT

Methods, devices and data stream are provided for signaling and decoding information representative of restrictions of navigation in a volumetric video. The data stream comprises metadata associated to video data representative of the volumetric video. The metadata comprise data representative of a viewing bounding box, data representative of a curvilinear path in the 3D space of said volumetric video; and data representative of at least one viewing direction range associated with a point on the curvilinear path.

10 Claims, 4 Drawing Sheets

(56) References Cited

U.S. PATENT DOCUMENTS

| | | | |
|---|---|---|---|
| 10,869,025 B2 | 12/2020 | Mate et al. | |
| 10,911,658 B2 | 2/2021 | Kim et al. | |
| 11,055,814 B2 | 7/2021 | Zhou | |
| 11,435,977 B2 * | 9/2022 | Lee | H04N 13/178 |
| 2012/0127169 A1 | 5/2012 | Barcay et al. | |
| 2014/0132594 A1 | 5/2014 | Gharpure et al. | |
| 2015/0178953 A1 | 6/2015 | Gao et al. | |
| 2016/0088281 A1 | 3/2016 | Newton et al. | |
| 2017/0316806 A1 | 11/2017 | Warren et al. | |
| 2017/0332064 A1 | 11/2017 | Martineau et al. | |
| 2017/0347026 A1 | 11/2017 | Hannuksela | |
| 2018/0061002 A1 | 3/2018 | Lee et al. | |
| 2018/0103242 A1 | 4/2018 | Budagavi et al. | |
| 2018/0220048 A1 | 8/2018 | Tamir et al. | |
| 2018/0324481 A1 | 11/2018 | Bordes et al. | |
| 2018/0338126 A1 | 11/2018 | Trevor et al. | |
| 2019/0114830 A1 | 4/2019 | Bouazizi et al. | |
| 2019/0238861 A1 | 8/2019 | D'Acunta et al. | |
| 2020/0226792 A1 | 7/2020 | Wang et al. | |
| 2020/0228775 A1 | 7/2020 | Sakai | |
| 2020/0304834 A1 | 9/2020 | Wang et al. | |
| 2021/0006614 A1 | 1/2021 | Oyman et al. | |
| 2021/0049828 A1 | 2/2021 | Park et al. | |
| 2021/0360219 A1 * | 11/2021 | Wang | H04N 13/111 |
| 2022/0217452 A1 * | 7/2022 | Wang | H04N 21/85 |
| 2023/0024615 A1 * | 1/2023 | Salmon-Legagneur | H04N 13/161 |

FOREIGN PATENT DOCUMENTS

| | | | | | |
|---|---|---|---|---|---|
| CN | 109792563 A | 5/2019 | | | |
| EP | 3329976 A1 | 6/2018 | | | |
| EP | 3451675 A1 | 3/2019 | | | |
| EP | 3457688 A1 | 3/2019 | | | |
| EP | 3489900 A1 | 5/2019 | | | |
| JP | 2017505943 A | 2/2017 | | | |
| JP | 2019062390 A | 4/2019 | | | |
| WO | 2018060334 A1 | 4/2018 | | | |
| WO | 2018127123 A1 | 7/2018 | | | |
| WO | WO-2018174542 A1 * | 9/2018 | | ............ | H04N 19/40 |
| WO | 2019013712 A1 | 1/2019 | | | |
| WO | 2019055389 A1 | 3/2019 | | | |
| WO | 2019118617 A1 | 6/2019 | | | |
| WO | 2019190203 A1 | 10/2019 | | | |
| WO | 2020013975 A1 | 1/2020 | | | |

OTHER PUBLICATIONS

Domanski et al., "Immersive visual media—MPEG-I: 360 video, virtual navigation and beyond", 2017 International Conference on Systems, Signals and Image Processing (IWSSI P), IEEE, May 22, 2017, 9 pages.

Dore et al., "3DoF+ proof of concept", ISO/IEC JTC1/SC29/WG11 MPEG2017/M40862, Jul. 2017, Torino, Italy, 3 pages.

Pesonen, Mika, et al., "V-PCC Visibility Cones", ISO/IEC JTC1/SC29/WG11 MPEG2019/M47365, Apr. 2019, Geneva, CH, 3 pages.

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

Schwarz et al., "Nokia's response to CfP for Point Cloud Compression (Category 2)", ISO/IEC JTC1/SC29/VVG11 V1PEG2017/M41779, Oct. 17, 2017, Macau, CN, 22 pages.

Shoi et al., "Text of ISO/IEC Dis 23090-2 Omnidirectional Media Format", ISO/IEC JTC1/SC29/WG11, Document: 416824, Hobart, Australia, Apr. 2017, 63 pages.

Skupin et al., "Standardization status of 360 degree video coding and delivery", 2017 IEEE Visual Communications and Image Processing (VCIP), IEEE, Dec. 10, 2017, 4 pages.

Wang et al., "MPEG-I Metadata of Improved 2dcc and New 6dsc and 6dcc Types", ISO/IEC JTC1/SC29/VVG11, V1PEG2016/M46130, Jul. 2019, Gothenburg, SE, 12 pages.

* cited by examiner

50

52

63

61

<u>70</u>

71

72

73

<u>80</u>

81

82

83

METHOD AND APPARATUS FOR DELIVERING A VOLUMETRIC VIDEO CONTENT

CROSS-REFERENCE TO RELATED APPLICATION

This application is a continuation U.S. Non-Provisional application Ser. No. 17/629,242 filed Jan. 21, 2022, which is a National Stage Application under 35 U.S.C. § 371 of International Application No. PCT/US2020/041878, filed Jul. 14, 2020, and claims priority of European patent application No. 19305968.0 filed Jul. 22, 2019 and European patent application No. 19306721.2 filed Dec. 20, 2019, the contents of all of which are hereby incorporated herein by reference as if fully set forth.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). In particular, the present principles relate to signaling and decoding information representative of restrictions of navigation in a volumetric video.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to) 360°. Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member. Between 3DoF+ and 6DoF experiences, it is possible to define the 4DoF+ case as an intermediate between 3DoF+ and 6DoF where the user's displacement is constrained along a curvilinear (1D) path within the 3D scene, with limited horizontal, vertical and depth translations around each path sample. The user can move within a kind of tunnel along a path with the guarantee of a good visual quality. If the user moves his virtual camera outside the tunnel, data will probably miss for a reconstruction of the 3D scene of a good quality.

The range of allowed positions for the user's virtual camera and viewing orientations during the navigation of a given volumetric video content may have to be restricted. Otherwise the user could "leave" the 3D scene when asking for viewports that cannot be fully rendered due to the lack of available visual data. Thus, there is a need for a solution for informing the end-user device of suitable, preferred and/or allowed viewer (virtual) positions and viewing orientations when consuming a given volumetric video content.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method and a device for signaling information representative of restrictions of navigation in a volumetric video. The method comprises encoding metadata in a data stream comprising video data representative of said volumetric video. The metadata comprise:

data representative of a viewing bounding box;

data representative of a curvilinear path in the 3D space of said volumetric video; and data representative of at least one viewing direction range associated with a point on said curvilinear path.

According to another aspect, there is provided a second method and a second device for decoding information representative of restrictions of navigation in a volumetric video. The second method comprises decoding metadata from a data stream comprising video data representative of the volumetric video. The metadata comprise:

data representative of a viewing bounding box;

data representative of a curvilinear path in the 3D space of said volumetric video; and data representative of at least one viewing direction range associated with a point on said curvilinear path;

According to another general aspect of at least one embodiment, there is provided a data stream comprising video data and associated metadata generated according to any of the described encoding embodiments or variants.

According to another general aspect of at least one embodiment, there is provided a non-transitory computer readable medium containing data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
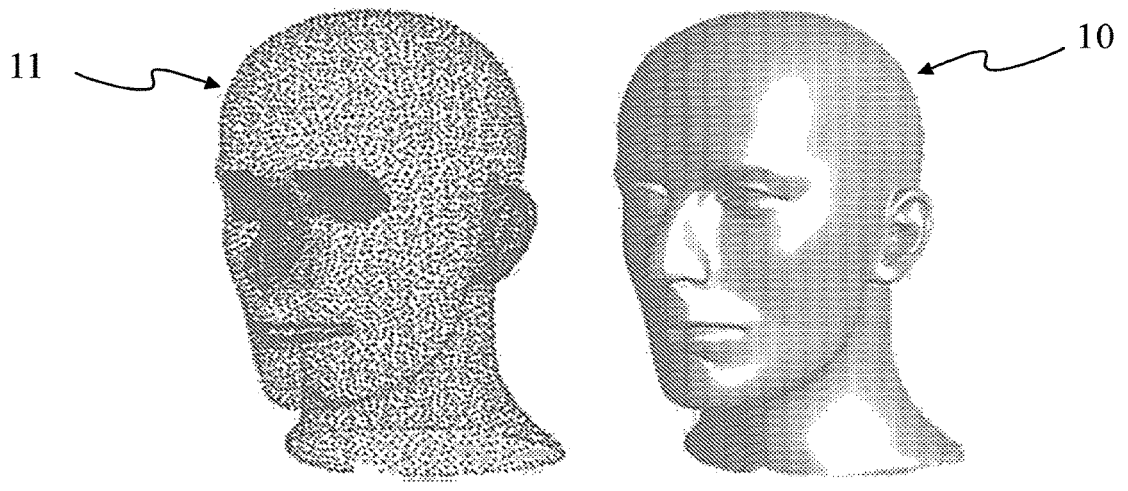
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
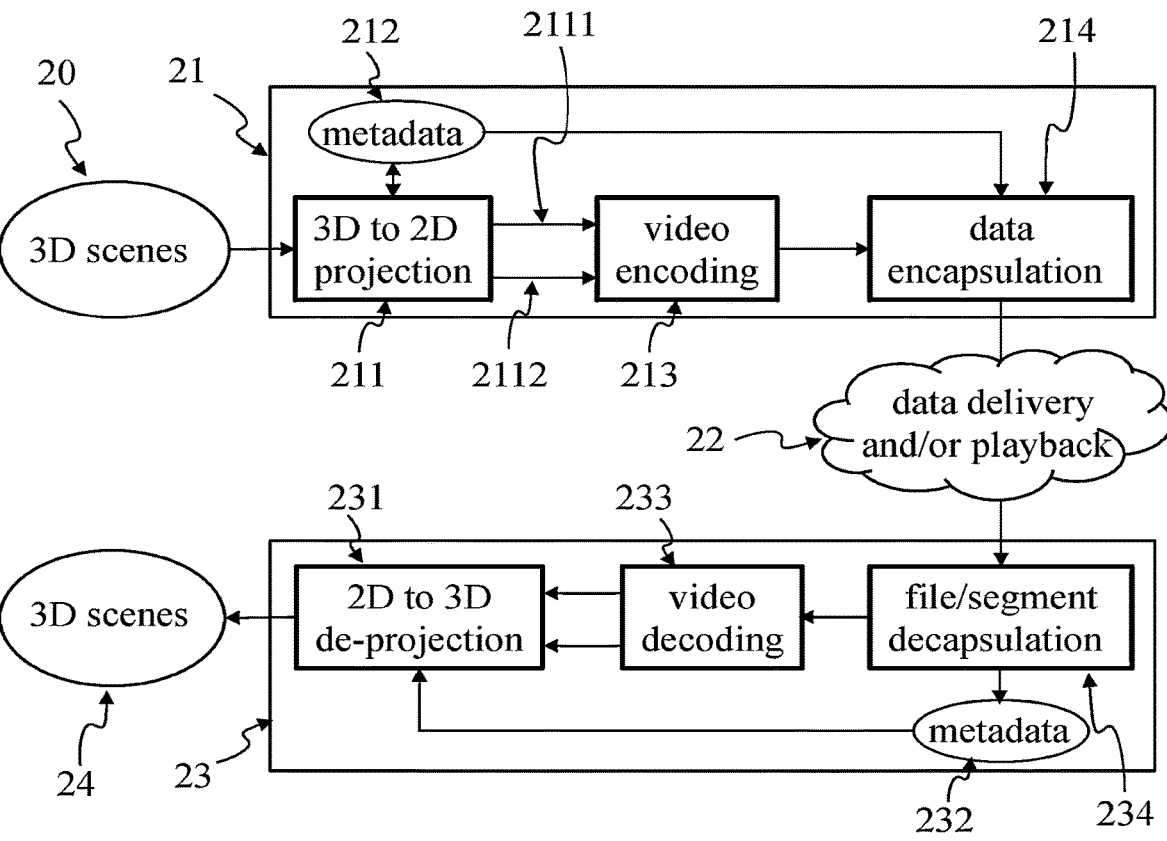
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

JPEG, specification ISO/CEI 10918-1 UIT-T Recommendation T.81, https://www.itu.int/rec/T-REC-T.81/en;

AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/rec/T-REC-H.265-201612-I/en annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
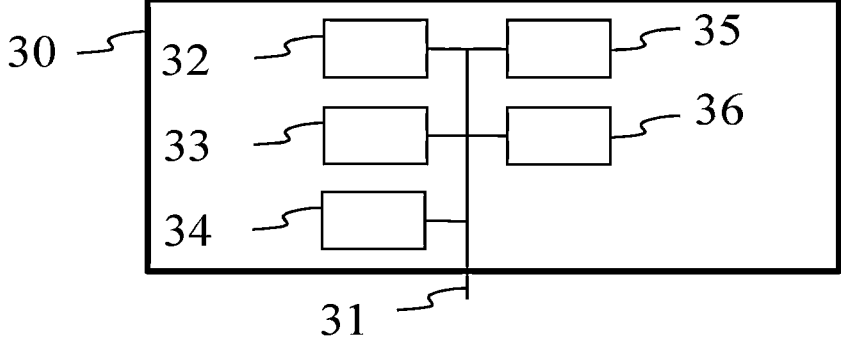
FIG. 3 shows an example architecture of a device which may be configured to implement a method described in relation with FIGS. 7 and 8, according to a non-limiting embodiment of the present principles.
Figures 6, 7, 8:
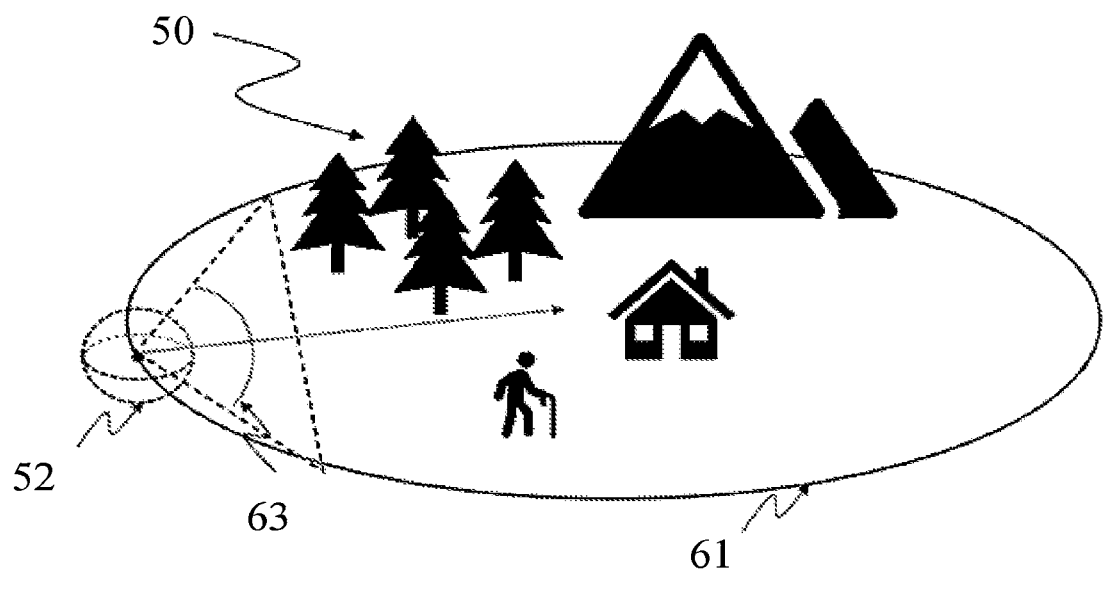
FIG. 6 illustrates the particular case of a circular path to navigate around a 3D scene with objects of interest at central position, according to a non-limiting embodiment of the present principles.
FIG. 7 diagrammatically illustrates a method 70 for signaling information representative of restrictions of navigation in a volumetric video, according to a non-limiting embodiment of the present principles.
FIG. 8 diagrammatically illustrates a method 80 for decoding information representative of restrictions of navigation in a volumetric video, according to a non-limiting embodiment of the present principles.

FIG. 3 shows an example architecture of a device 30 which may be configured to implement a method described in relation with FIGS. 7 and 8. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

a microprocessor 32 (or CPU), which is, for example, a DSP (or Digital Signal Processor);

a ROM (or Read Only Memory) 33;

a RAM (or Random Access Memory) 34;

a storage interface 35;

an I/O interface 36 for reception of data to transmit, from an application; and a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 7 and 8, and belongs to a set comprising:

a mobile device;

a communication device;

a game device;

a tablet (or tablet computer);

a laptop;

a still picture camera;

a video camera;

an encoding chip;

a server (e.g. a broadcast server, a video-on-demand server or a web server).

Figure 4:
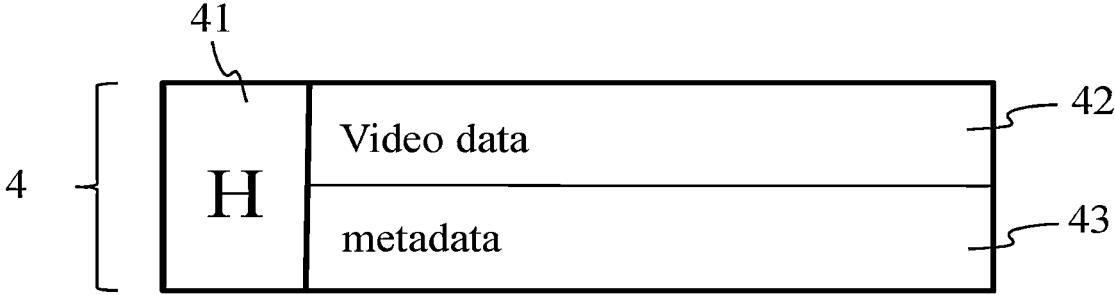
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
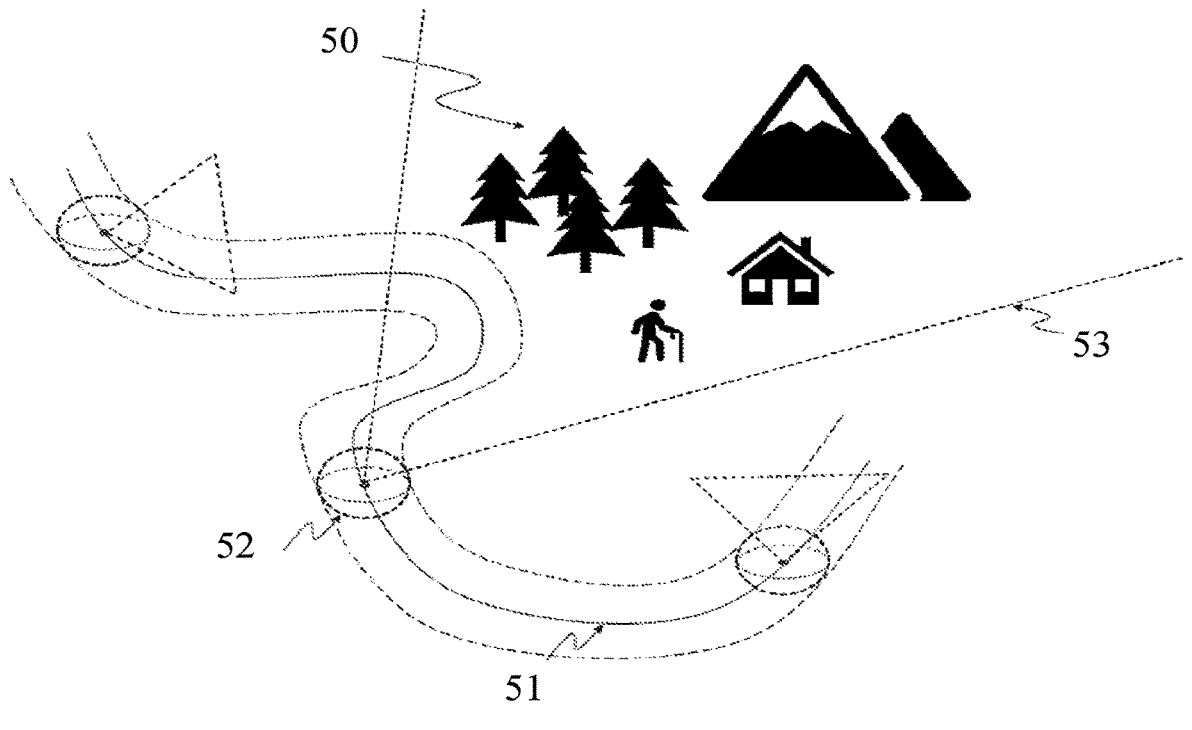
FIG. 5 schematically illustrates the concept of restricted navigation within a virtual 3D scene, by depicting one curvilinear path, and at a given position along this path a spherical bounding box and a viewing orientation range, according to a non-limiting embodiment of the present principles.

FIG. 5 schematically illustrates the concept of restricted navigation within a virtual 3D scene, by depicting one curvilinear path, and at a given position along this path a spherical bounding box and a viewing orientation range. The navigation restrictions are determined per content, at content creation stage, with the additional benefit of potentially adding subjective (e.g. artistic) constraints to the 3D geometry objective constraints.

According to the present principles, an arrangement of high-level syntax elements that explicitly describe a sub-set of viewing positions and orientations associated with a given volumetric video content representative of a 3D scene 50. The signaled information comprises the following elements:

a curvilinear path 51 (or a set of curvilinear paths) in the 3D space, an elementary bounding box volume 52, a set of viewing orientation ranges 53, indexed by the position along the curvilinear path(s)

The combination of these elements describes virtual displacements along the path(s) that are suitable, preferred and/or allowed for a good quality of the 3D scene recnstruction. At each position along the path(s), small translations within the bounding box are possible and the viewing orientation is restricted within a given angular range. This can be described as 4DoF+ virtual navigation "tunnels".

According to a first embodiment the set of curvilinear navigation paths are defined by sets of 3D points, with the following syntax and semantics:

```
aligned(8) class NavigationPathSet( )
{
    ViewingBoundingBox;
    unsigned int(8) num_paths;
    for (n=0; n<num_paths; n++) {
        unsigned int(32) num_points[n];
        for (i=0; i<num_points[n]; i++) {
            unsigned int(32) X[n][i];
            unsigned int(32) Y[n][i];
            unsigned int(32) Z[n][i];
            signed int(32) phi_min[n][i];
            signed int(32) phi_max[n][i];
            signed int(32) theta_min[n][i];
            signed int(32) theta_max[n][i];
        }
    }
}
```

```
aligned(8) class ViewingBoundingBox( )
{
    unsigned int(8) shape_type;
    unsigned int(32) first_dimension;
    unsigned int(32) second_dimension;
    unsigned int(32) third_dimension;
}
``` num_paths specifies the number of curvilinear navigation paths which have been defined to navigate the content. Value 0 indicates that the entire 3D space can be navigated.

num_points specifies the number of sampled 3D points along the curvilinear navigation path.

X[n][i], Y[n][i], Z[n][i] are fixed-point values (for example 16.16 values) defining the 3D coordinates of the ith sample along the nth path in the global coordinate system of the 3D scene. The points are ordered according to the curvilinear abscissa along the path. The nth path is therefore defined in-between the two 3D endpoints (X[n][0], Y[n][0], Z[n][0]) and (X[n][num_points[n]−1], Y[n][num_points [n]−1], Z[n][num_points[n]−1]). For example, the curvilinear path may be a piecewise path of straight path between to consecutive points in the list and from the last point to the first point of the list. In a variant, the curvilinear path may be determined by using quadratic or cubic Bezier curves by using three or four consecutive points.

phi_min[n][i], phi_max[n][i] and theta_min[n][i], theta_max[n][i] are the minimum and maximum values for the azimuthal and elevation angles which delimit the viewing orientation at the ith point along the nth path in units of $2^{16}$ degrees. Azimuth values are, for instance, in the range of $-180*2^{16}$ to $180*2^{16}-1$, inclusive. Elevation values are, for instance, in the range of $-90*2^{16}$ to $90*2^{16}$, inclusive. Azimuth and elevation values may be expressed in different measurement units, for instance in radians.

shape_type specifies the shape of the viewing bounding box within which the user is allowed to slightly move at a given position along a navigation path. shape_type equal to 0 indicates a sphere, the radius of which is specified by first_dimension. The syntax allows to define more complex ellipsoid or cuboid 3D volumic shapes.

According to another embodiment, a lightweight viewing space 54 specification is obtained by infering the navigation path 51 from the parameters of the acquisition cameras associated with the volumetric content. The 3D points which sample the navigation paths are the 3D positions of acquisition cameras. The viewing direction (center azimuthal and elevation angles) at each sample position is the acquisition camera viewing direction at that position. As the acquisition extrinsic camera parameters are already part of the metadata associated with a volumetric video content, the additional metadata to transmit to specify the viewing space reduces to the shape and size of the viewing box at each sample position, as well as the azimuth and elevation angular ranges around the viewing directions. An example of syntax and associated semantics is the following:

```
aligned(8) class NavigationPathFromCameraRig( )
{
    ViewingBoundingBox;
    unsigned int(8) num_paths;
    for (n=0; n < num_paths; n++) {
        unsigned int(32) num_cams[n];
        for (i=0; i < num_cams[n]; i++) {
            unsigned int(32) cam_idx[n][i];
            unsigned int(32) phi_range[n][i];
            unsigned int(32) theta_range[n][i];
        }
    }
}
``` num_cams[n] is the size of the subset of acquisition cameras used to sample the nth navigation path. cam_idx [n][i] is the index of the ith camera along the nth navigation path (among the list of all acquisition cameras). phi_range [n][i] and theta_range[n][i] are the range of azimuthal and elevation angle deviation at that ith position along the nth path, around the azimuthal and elevation angle of the cam_idx[n][i]th acquisition camera.

Figure 5B:
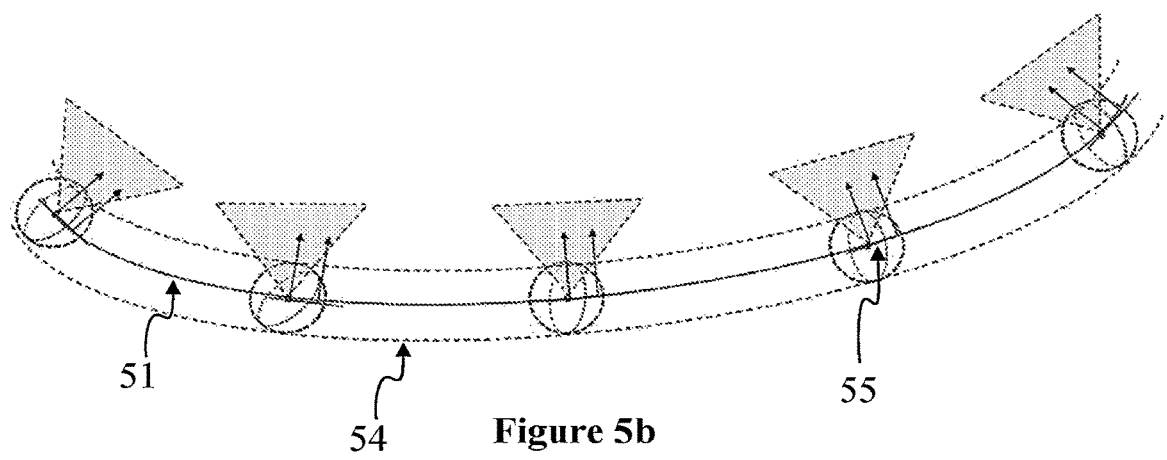
FIG. 5b illustrates an example of acquisition camera rig with five converging cameras placed on a circular arc, with a tuboid viewing space inferred from the acquisition cameras' positions and directions, according to a non-limiting embodiment of the present principles.

Such a viewing space specification is particularly suited for volumetric content captured with a rig of cameras positioned along an arc of a circle. FIG. 5b illustrates an example of viewing space 54 associated with 3D content captured from such a rig: ten cameras arrange into five pairs of convergent cameras 55 capture the 3D scene; a tuboid-shaped viewing space 54 is specified by sampling 5 spheroids at every other camera location.

FIG. 6 illustrates the particular case of a circular path to navigate around a 3D scene with objects of interest at central position. In this use case, the user is allowed to walk around 3D scene 50 on a circular path 61 within a horizontal plane at a given height value in the global coordinate system, with an inward field-of-view 63. Displacements within bounding box 52 are allowed as in the first embodiment.

An example of syntax and semantics may be the following:

```
aligned(8) class CircularNavigationPath( )
{
    ViewingBoundingBox;
    signed int(32) center_x;
    signed int(32) center_y;
    signed int(32) center_z;
    unsigned int(32) radius;
}
```

-continued

```
        signed int(32) delta_phi;
        signed int(32) theta_min;
        signed int(32) theta_max;
    }
``` center_x, center_y, center_z are fixed point values (e.g. 16.16 values) defining the 3D coordinates of the center of the circular path.

radius is a fixed point value definig the radius of the circular path.

phi_range is the angular range which delimits the azimuthal viewing orientation at any point on the circular path (relatively to the radial direction), in units of $2^{16}$ degrees. delta_phi values shall be in the range of 0 to $360*2^{16}-1$, inclusive.

theta_min, theta_max are the minimum and maximum values of viewing elevation angles at any point on the circular path in units of $2^{16}$ degrees. Elevation values shall be in the range of $-90*2^{16}$ to $90*2^{16}$, inclusive.

More generally, the curvilinear navigation paths may be defined by parametric 3D curves: X=f(s), Y=g(s), Z=h(s), s being a scalar value. A multiplicity of such functional parameterizations is suitable according to the present principles. This generic approach is particularly adapted to typical 4DoF+ experiences like rendering volumetric videos of sport events or concert events. For such 4DoF+ videos, the suitable, preferred and/or allowed path has a simple shape that can be parametrized using a low number of parameters, like, for instance an ellipse in the stands of a stadium or a rectangle around a stage or the field of a stadium.

FIG. 7 diagrammatically illustrates a method 70 for signaling information representative of restrictions of navigation in a volumetric video. At a step 71, volumetric video data are obtained. Data representative of a curvilinear path and of viewing direction ranges for points of the curvilinear path are obtained at the same time. The curvilinear path associated to a viewing bounding box is representative of restrictions of navigation in the 3D space comprising the 3D scene of the volumetric video. According to the embodiment of the present principles, these data may be represented through different data structures as described in relation to FIGS. 5 and 6. At a step 72, the volumetric video data are encoded in a data stream in association with metadata comprising the restrictions of navigation obtained at step 71. At a step 73, the data stream encoded at step 72 may be stored in a non-transitory medium or transmitted to a client device.

According to an embodiment, the proposed restricted navigation path message is encoded within the video stream in a dedicated SEI message (Supplemental Enhancement Information). According to another embodiment, the proposed restricted navigation path message is encoded at the container level using the ISO Base Media File Format. The addition of such a navigation path message in the metadata of a volumetric video stream allows, at renderer side, constraining the virtual navigation to viewing positions and orientations consistent with the encoded 3D scene content, thus ensuring the quality of the immersive experience.

FIG. 8 diagrammatically illustrates a method 80 for decoding information representative of restrictions of navigation in a volumetric video. At a step 81, a data stream comprising video data of the volumetric video is obtained from a source. The data stream also comprise metadata associated with the volumetric video and representation of restrictions of navigation in the 3D space comprising the 3D scene of the volumetric video. At a step 82, video data and metadata are decoded. The metadata comprise data representative of a viewing bounding box, data representative of a curvilinear path in the 3D space of the volumetric video, and data representative of at least one viewing direction range associated with a point on the curvilinear path. These data may be represented by different data structure according to the embodiment of the present principles as illustrated in relation to FIGS. 5 and 6. At a step 83, information representative of the restrictions of navigation in the 3D space of the 3D scene is retrieved by using the decoded metadata and this information is used by the renderer. For example, the renderer may warn the user when he tries to leave the tunnel in which a good quality of the rendering is guaranteed. The renderer may also prevent the virtual camera from moving outside the describe volume or modify the rendering (for instance by fading the image) when the user is moving outside the suitable path.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for rendering a volumetric video according to restrictions of navigation, the method comprising decoding metadata from a data stream comprising video data representative of the volumetric video, the metadata comprising:

data representative of a curvilinear path in a three-dimensional (3D) space of the volumetric video; data representative of at least two 3D points of view on the curvilinear path associated with a viewing direction range; and data representative of a viewing bounding box centered around one of the at least two 3D points of view; and rendering the volumetric video from a point of view within the viewing box associated with a first point of view of the at least two points of view in a limit of the associated viewing direction range.

2. The method of claim 1, wherein an action from a user displaces the first point of view to a second point of view of the at least two points of view, the rendering being performed according to the data associated with the second point of view.

3. The method of claim 1, wherein an action from a user displaces the first point of view to a third point of view located on the curvilinear path and between two of the at least two points of view, the rendering being performed according to data computed according to the data associated with the two of the at least two points of view.

4. The method of claim 1, wherein the data representative of a curvilinear path comprises parameters representative of parametric 3D curves, and wherein data representative of at least one 3D point is associated to one origin point of the curvilinear path.

5. The method of claim 1, wherein the metadata comprises data representative of at least two curvilinear paths in the 3D space of the volumetric video, and wherein an action from a user displaces the first point of view of a first curvilinear path to a first point of view of a second curvilinear path.

6. A device for rendering a volumetric video according to restrictions of navigation, the device comprising a processor configured for decoding metadata from a data stream comprising video data representative of the volumetric video, the metadata comprising:

data representative of a curvilinear path in a three-dimensional (3D) space of the volumetric video; data representative of at least two 3D points of view on the curvilinear path associated with a viewing direction range; and data representative of a viewing bounding box centered around one of the at least two 3D points of view; and rendering the volumetric video from a point of view within the viewing box associated with a first point of view of the at least two points of view in a limit of the associated viewing direction range.

7. The device of claim 6, wherein an action from a user displaces the first point of view to a second point of view of the at least two points of view, the rendering being performed according to the data associated with the second point of view.

8. The device of claim 6, wherein an action from a user displaces the first point of view to a third point of view located on the curvilinear path and between two of the at least two points of view, the rendering being performed according to data computed according to the data associated with the two of the at least two points of view.

9. The device of claim 6, wherein the data representative of a curvilinear path comprises parameters representative of parametric 3D curves, and wherein data representative of at least one 3D point is associated to one origin point of the curvilinear path.

10. The device of claim 6, wherein the metadata comprises data representative of at least two curvilinear paths in the 3D space of the volumetric video, and wherein an action from a user displaces the first point of view of a first curvilinear path to a first point of view of a second curvilinear path.

* * * * *